United States Patent
Nakata et al.

(10) Patent No.: US 7,454,507 B2
(45) Date of Patent: Nov. 18, 2008

(54) MULTI FUNCTIONAL PERIPHERAL DEVICE PROCESSING AND TRANSMITTING DATA BASED ON SELECTION REPLIED BY USER FROM ANOTHER DEVICE

(75) Inventors: Hironobu Nakata, Itami (JP); Takeshi Morikawa, Takarazuka (JP); Tatsuya Tanigawa, Himeji (JP); Kiyoshi Emori, Takatsuki (JP)

(73) Assignee: Minolta Co., Ltd., Osaka-Shi, Osaka (JP)

( * ) Notice: Subject to any disclaimer, the term of this patent is extended or adjusted under 35 U.S.C. 154(b) by 698 days.

(21) Appl. No.: 10/449,411

(22) Filed: Jun. 2, 2003

(65) Prior Publication Data

US 2004/0030684 A1    Feb. 12, 2004

(30) Foreign Application Priority Data

Jun. 3, 2002    (JP)    ............................. 2002-161640

(51) Int. Cl.
    *G06F 15/16*    (2006.01)
(52) U.S. Cl. .................. 709/228; 709/218; 709/217
(58) Field of Classification Search ................ 358/1.13, 358/1.15, 402, 400, 407; 709/217, 225, 206, 709/228, 218; 713/1
    See application file for complete search history.

(56) References Cited

U.S. PATENT DOCUMENTS 6,823,365 B1 * 11/2004 Mattis et al. ................. 709/206

2003/0081234 A1 * 5/2003 Wiley .......................... 358/1.13
2003/0093525 A1 * 5/2003 Yeung et al. ................. 709/225
2003/0115284 A1 * 6/2003 Henry ......................... 709/217
2003/0115326 A1 * 6/2003 Verma et al. ................. 709/225
2003/0188145 A1 * 10/2003 Richardson et al. ............ 713/1

FOREIGN PATENT DOCUMENTS

| JP | 07-230372 | 8/1995 |
| JP | 2000-041063 | 2/2000 |
| JP | 2001-43154 | 2/2001 |
| JP | 2001-256012 | 9/2001 |

OTHER PUBLICATIONS

Notice of Grounds of Rejection issued in corresponding Japanese Patent Application No. 2002-161640, and translation thereof, Feb. 6, 2007.

* cited by examiner

*Primary Examiner*—Le Luu
(74) *Attorney, Agent, or Firm*—Buchana Ingersoll & Rooney PC

(57) ABSTRACT

Upon reception of a data transmission request, an image input device 1 searches for transmission means available for transmission to a destination, such as transfer to FTP server or transmission by e-mail, and lists all the extracted available transmission means. Image input device 1 then creates a selection menu executed as an applet for receiving a selection of transmission methods from the destination. The destination can use the selection menu acquired from image input device 1 to designate the priority order of desired transmission means and a file name in reception of transmitted data. The selection menu thus created is transmitted to the image input device 1.

17 Claims, 10 Drawing Sheets

MULTI FUNCTIONAL PERIPHERAL DEVICE PROCESSING AND TRANSMITTING DATA BASED ON SELECTION REPLIED BY USER FROM ANOTHER DEVICE

This application is based on Japanese Patent Application No. 2002-161640 filed with Japan Patent Office on Jun. 3, 2002, the entire content of which is hereby incorporated by reference.

BACKGROUND OF THE INVENTION

1. Field of the Invention

The present invention relates to a data processing device and a data processing method, and more particularly to a data processing device and a data processing method allowing data to be output as desired by a destination.

2. Description of the Related Art

Conventionally, it has been proposed that, in transmitting data, a data transmission mode for data to be transmitted is sent to a destination in order to check the capacity of the destination, and the data is transmitted in accordance with the mode: as replied.

Japanese Laid-Open Patent Publication No. 2001-43154, for example, discloses a communication control method for an e-mail system in which, in transmitting an image file by e-mail, specific information that requests the capacity of the destination is embedded in the image file, and when a reply to the request is returned, the image file is resent to the destination in accordance with the reply.

In a printing system disclosed in Japanese Laid-Open Patent Publication No. 2001-256012, entry form data that provides a list of available printers is created and sent from a server to a Web browser of a client. At the client, the sent entry form data is used to designate printing data, a printer, and a printing time.

In the communication control method disclosed in the Japanese Laid-Open Patent Publication No. 2001-43154 as described above, however, even if data is transmitted in accordance with the capacity of the designation, the data is not always transmitted in a format desired by the designation. For example, even if the facsimile transmission is performed in accordance with the capacity at the designation, the other end of transmission might desire transmission by e-mail. In this way, the format in which data is transmitted does not always match with the format desired by the other end of transmission.

In the printing system disclosed in Japanese Laid-Open Patent Publication No. 2001-256012, while the printing processing can be performed, data cannot be provided in other data printing processing methods as desired by the client.

SUMMARY OF THE INVENTION

Therefore, an object of the present invention is to provide a data processing device and a data processing method allowing data to be output as desired by a destination.

The aforementioned object of the present invention is achieved by a data processing device including: a search unit searching for and extracting plural kinds of data processing methods executable in the data processing device; a preparation unit preparing a form on which at least one kind of data processing method is selected among all of the data processing methods extracted by the search unit; a communication unit transmitting the form prepared by the preparation unit to another device to allow an operator to select at least one kind of data processing method, and receiving a result of the selection from another device; and a processor processing data based on the selected data processing method.

In order to achieve the aforementioned object, in accordance with another aspect of the present invention, a data processing device includes: a transmitting unit transmitting a form to another device, the form allowing an operator to select at least one kind of data processing method on another device; a receiving unit receiving a result of the selection on the form from another device; and a processor processing data based on the selected data processing method.

In order to achieve the aforementioned object, in accordance with a further aspect of the present invention, a data processing method used in a system with a data processing device having plural kinds of data processing methods and another device connected to the data processing device, includes the steps of: preparing a form on which at least one kind of data processing method can be selected; selecting a kind of data processing method on the form; and processing data based on the selected data processing method.

The foregoing and other objects, features, aspects and advantages of the present invention will become more apparent from the following detailed description of the present invention when taken in conjunction with the accompanying drawings.

DESCRIPTION OF THE PREFERRED EMBODIMENT

Figure 1:
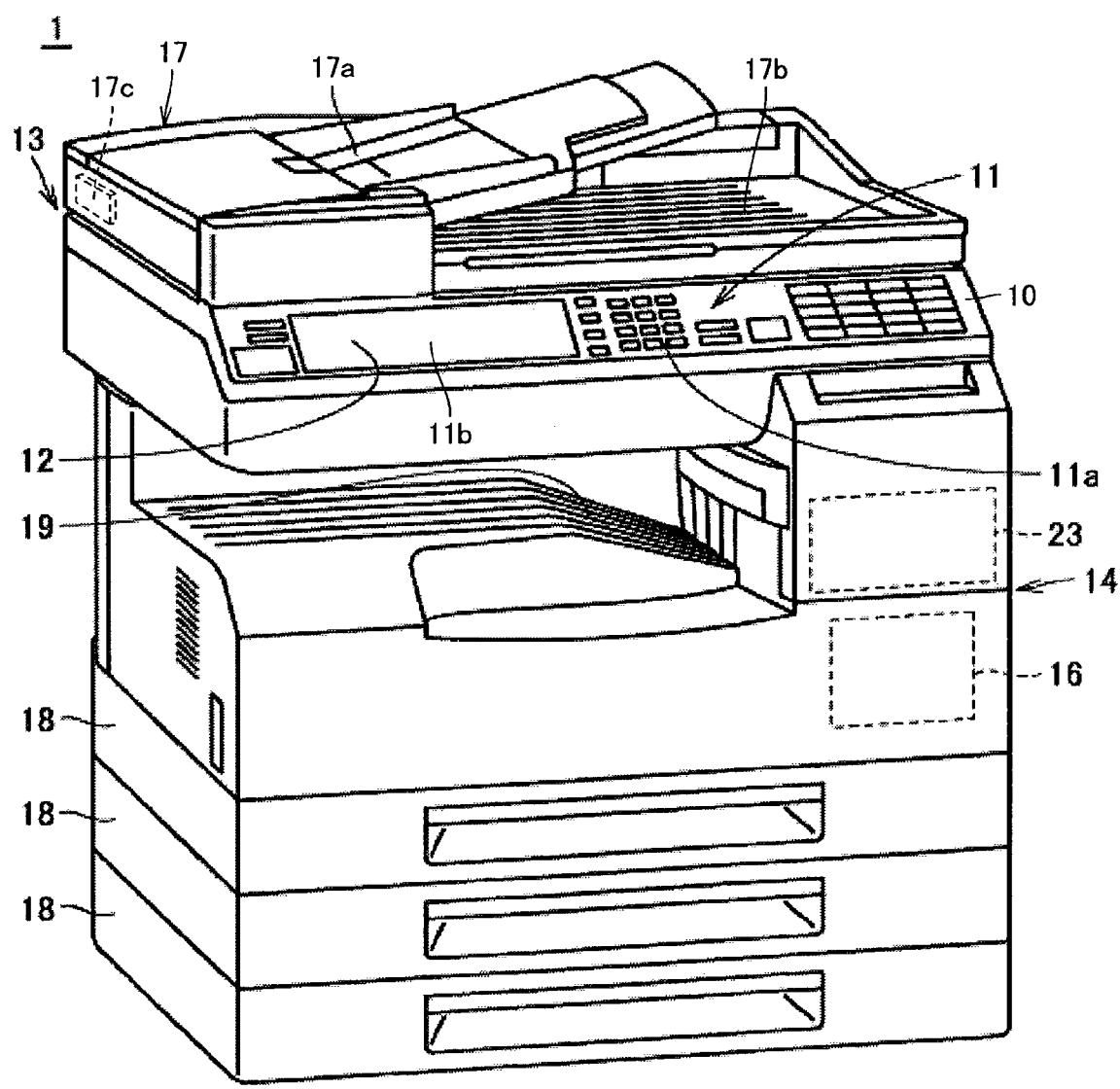
FIG. 1 is an external view of an image input device 1 in an embodiment of the present invention.

In the following, an embodiment of the present invention will be described with reference to the figures. In the following description, the same parts and components will be denoted with the same reference characters. The designations and functions thereof are the same. The detailed description thereof will thus not be repeated.

FIG. 1 is an external view of an image input device 1 in accordance with the present embodiment. In the present embodiment, image input device 1 is a device called MFP (Multi Function Peripheral), a composite machine having functions of a scanner, a copying machine, a printer, a facsimile machine, and the like. Image input device 1 has a function of transmitting input image data and can receive/transmit data via a network such as LAN (Local Area Network) or the Internet and a communication network such as a public telephone line.

As shown in FIG. 1, image input device 1 includes an operation unit 11 including a plurality of keys 11a and a touch panel sensor 11b, for receiving a variety of instructions and data input including characters, numerals and the like through the user's operation, a display 12 presenting an instruction selection menu, information concerning acquired data, and the like to the user, a scanner unit 13 photoelectrically reading a document for acquiring image data, and a printer unit 14 printing an image on a recording sheet based on the image data.

Image input device 1 is provided on the top of the body with an automatic document feeder (feeder unit) 17 for feeding an image to scanner unit 13, and on the bottom with a paper feeding unit 18 supplying recording sheets to printer unit 14. At the center, provided is a tray 19 into which a recording sheet having a printed image is discharged by printer 14. Inside the body, provided are a communication unit 16 receiving/transmitting image data from/to an external device over a network, and a storage unit 23 configured with a memory, a magnetic disk device, or the like for storing image data and the like. It is noted that, though not shown, image input device 1 has a network interface for connecting to a network such as LAN and an interface for receiving facsimile data from a communication network, and communication unit 16 is connected to a network through the network interface and also to a communication network to allow a variety of data to be received/transmitted from/to the external device.

Display 12 presents a list of destinations in designating a destination of data transmission and also presents a setting dialogue window in setting scan conditions, data transmission conditions and the like. Touch panel sensor 11b is provided on the surface of display 12 and is configured to facilitate the user's operation in designating a destination, setting the scan conditions, and setting the data transmission conditions. Operation unit 11 including a plurality of keys 11a and touch panel sensor 11b is used for a variety of inputs including selection of destination by the user. Operation unit 11 and display 12 function as an operation panel that is a main part of the user interface.

Scanner unit 13 functions as reading means (input means) for reading a document and photoelectrically reads image information such as photographs, characters, pictures, and the like from the document to produce an image signal. The produced image signal is converted to digital data in an image data generating unit, and after a variety of well-known image processing, is sent to printer unit 14 or communication unit 16 for image printing or data transmission. The image data is also stored in storage unit 23 for later use.

Printer unit 14 prints an image on a recording sheet based on image data acquired from scanner unit 13, image data received by communication unit 16 from an external device, or image data stored in storage unit 23.

Communication unit 16 receives data such as facsimile data via a communication network at a data receiving unit 16a (not shown) and transmits data such as facsimile data via a communication network at a data transmitting unit 16b (not shown). Communication unit 16 also receives/transmits data over a network using e-mail and the like from/to an external device connected to the network. Image input device 1 therefore has a function as a facsimile machine for normal facsimile communications and also has a function as a terminal receiving/transmitting e-mail. Thus, it can receive/transmit a variety of image data as an attachment file to e-mail. It is noted that the network communications performed by image input device 1 may be either wired or wireless.

Automatic document feeder 17 is a device that automatically feeds a document placed in a document placing unit 17a to scanner unit 13 one by one and allows the read document to be successively stacked on a discharge unit 17b. A detector 17c detecting a break in a plurality of placed documents by detecting a blank document or the like is provided inside automatic document feeder 17. Detector 17c may be configured to detect as a break a document that has no valid image component when read by scanner unit 13, and in this case, scanner unit 13 functions as detector 17c.

A technique for detecting a break is not limited to the blank document detection as described above, and a variety of well-known conventional techniques concerning the document-break detection for sorting recording sheets may be used. For example, a break may be detected by inserting a sheet having a size different from the document size between document groups or by placing a head or end document of each document group in a direction different from the other documents (for example a direction rotated by 90°) to allow a prescribed sensor such as a document-size detecting sensor to detect such a sheet/document.

Figure 2:
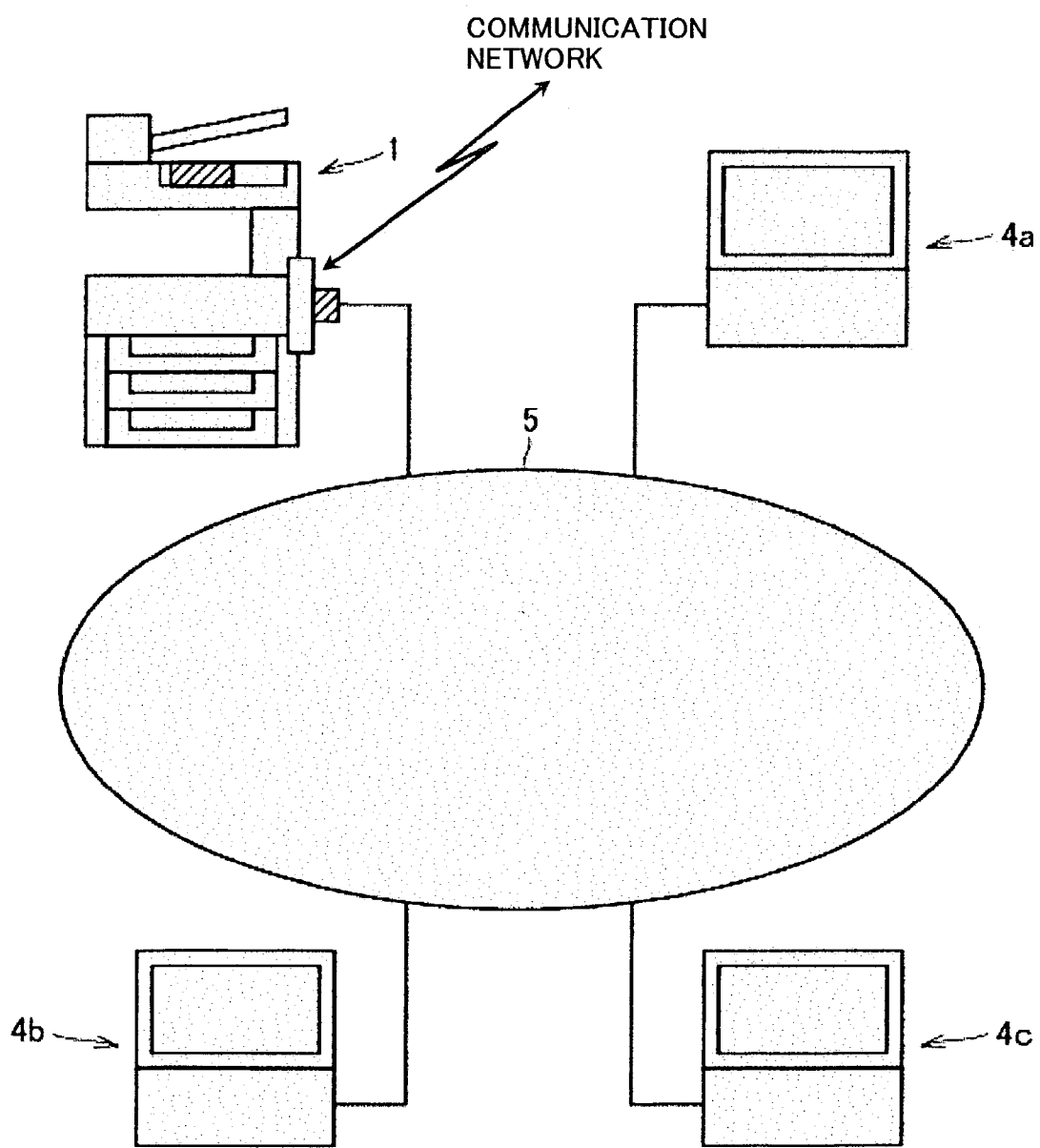
FIG. 2 is a view showing a system configuration formed with image input device 1, and data receiving devices 4a, 4b and 4c receiving a supply of data from image input device 1.

FIG. 2 is a view showing a system configuration formed with image input device 1 and data receiving devices 4a, 4b and 4c receiving a data supply from image input device 1. A plurality of data receiving devices 4a, 4b and 4c each are formed of a computer, and at least one (for example data receiving device 4a) of a plurality of data receiving devices 4a, 4b and 4c functions as a server. It is noted that although FIG. 2 shows only one image input device 1 connected to network 5 by way of example, a plurality of image input devices 1 may be connected and the number of data receiving devices is not limited to three. Of data receiving devices 4a, 4b and 4c described above, the data receiving device, excluding one that functions as a server, is not limited to a computer such as a personal computer and may be a computer as a portable terminal such as PDA (Personal Digital Assistants).

Image input device 1 can receive facsimile data via a communication network and perform printing based on the content of the received facsimile data, and also has a function of storing the content of the facsimile data as image data and transmitting the content to server 4a connected to network 5.

Server 4a is configured to store data received from image input device 1 into a storage unit such as a magnetic disk device and to send out a designated file to data receiving devices 4b, 4c when accessed from data receiving devices 4b, 4c, and the like.

Therefore, image data of a document read by scanner unit 13 of image input device 1 is utilized in any of data receiving devices 4a, 4b, 4c. When image input device 1 transmits data, the data may not always be transmitted to server 4a. Using e-mail or the like, for example, the data can be directly transmitted to any data receiving device. Data receiving devices 4a, 4b, 4c also can acquire not only image data read by image input device 1 but also image data received as facsimile data.

In the present embodiment, image input device 1 is configured to divide image data being input through scanner unit 13 or communication unit 16 at each prescribed break to create a plurality of image files and, in data transmission, to unite a plurality of image files in one sending file for transmission. Given that a received file must be available at data receiving devices 4a, 4b, 4c, when image input device 1 units a plurality of image files, it creates a sending file in such a manner that a plurality of original image files can be restored from the sending file at the destination.

In the following, the function and operation of image input device 1 described above will be described in detail.

To begin with, the function and operation concerning data transmission will be described where image input device 1 transmits image data input at scanner unit 13 scanning a document or image data received at data receiving unit 16a via a communication network, to data receiving devices 4a, 4b, 4c as destinations over network 5.

Figure 3:
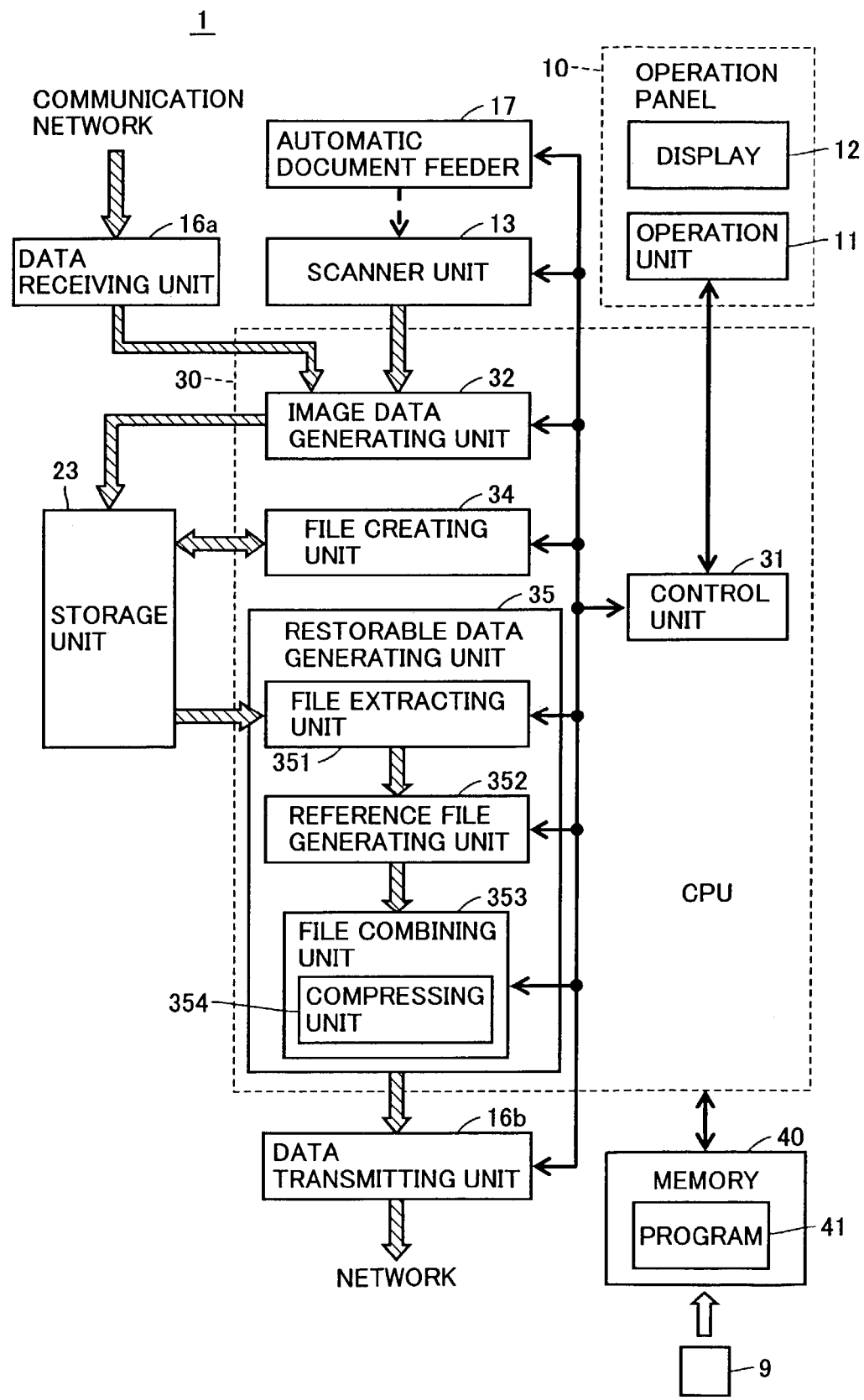
FIG. 3 is a block diagram showing a configuration of image input device 1 for performing data transmission.

FIG. 3 is a block diagram showing a configuration of image input device 1 for data transmission. In FIG. 3, the shaded arrows indicate the flows of image signals, image data and the like, and thin solid arrows indicate the flows of control signals.

Referring to FIG. 3, a CPU (Central Processing Unit) 30 is provided within image input device 1, and CPU 30 functions as a control unit 31, an image data generating unit 32, a file creating unit 34, and restorable data creating unit 35 upon execution of a program 41 stored in a memory 40. Restorable data creating unit 35 functions as a file extracting unit 351, a reference file creating unit 352 and a file combining unit 353 under an instruction from control unit 31. File combining unit 353 further functions as a compressing unit 354.

Program 41 may be stored in memory 40 in advance. Alternatively, a program stored in a computer readable recording medium 9 such as a memory card may be stored into memory 40 under control of CPU 30.

Control unit 31 controls each component in data transmission based on input information as set by the user through operation panel 10 including operation unit 11 and display 12.

When the user provides an instruction to start scanning using operation panel 10, control unit 31 sets the scan condition, the operation mode, and the like, and thereafter operates automatic document feeder 17 and scanner unit 13 synchronously to allow scanner unit 13 to automatically read the document from automatic document feeder 17 one by one.

Image data generating unit 32 successively converts the image signal for each sheet obtained from scanner unit 13 to digital data and also performs prescribed processing to generate image data, for example, in PDF (Portable Document Format) format and the like. The image data generated at image data generating unit 32 is successively stored in storage unit 23. Thus, upon the start of automatic reading of documents, image data corresponding to the number of read sheets is accumulated in storage unit 23. Similarly, the image signal received at data receiving unit 16a is also converted to digital data at image data generating unit 32 and is successively stored in storage unit 23.

When automatic document feeder 17 and scanner unit 13 synchronously operate to continuously read a plurality of documents placed on document placing unit 17a, control unit 31 generates a break signal at the dividing timing as being set. The break signal is a signal for dividing image data of continuously input documents and creating one image file for each document group (image group) as divided. When ten sheets of document are read and divided into three groups, for example, into a first image file for the first three sheets of document images, a second image file for the next four sheets of document images and a third image file for the last three sheets of document images, the break signals are generated at the time points of the end of reading the third sheet, the end of reading the seventh sheet, and the end of reading the tenth sheet.

The timing of generating a break signal varies with the type of operation mode. The operation mode includes an auto mode and a manual mode. In the auto mode, when a plurality of documents are continuously fed at automatic document feeder 17, detector 17c of automatic document feeder 17 automatically detects a break between the documents, and control unit 31 generates a break signal in accordance with the detection result. In the manual mode, control unit 31 generates a break signal at any timing manually designated by the user using operation panel 10. The break signal is supplied from control unit 31 to file creating unit 34.

Control unit 31 generates a break signal only when the user performs a document break setting. Therefore, without the document break setting, one image file is created for images concerning all the documents after the reading is finally completed, and the images are transmitted to data receiving devices 4a, 4b, 4c, in a manner similar to the conventional.

Upon detection of a break signal from control unit 31, file creating unit 34 accesses storage unit 23 at this point of time and creates one image file from the image data stored in storage unit 23. File creating unit 34 then attaches a unique file name to the image file and stores the file into storage unit 23 again. Where a break signal is detected upon the completion of reading of the third sheet of ten sheets of document, for example, file creating unit 34 retrieves image data of three sheets stored in storage unit 23, creates one image file including the image data of these three sheets and stores the image file with a file name into storage unit 23 again.

By repeating such operations until the reading of all the documents is completed, a plurality of image files each created at a break signal in file creating unit 34 are stored in storage unit 23. Where ten sheets of document are divided into three, for example, three image files are stored in storage unit 23.

Description will now be made to a process where image input device 1 is used to transmit data to data receiving device 4 as a desired destination (data receiving devices 4a, 4b and 4c will be collectively referred to as data receiving device 4). It is noted that the transmitted data is stored in storage unit 23.

Figure 4:
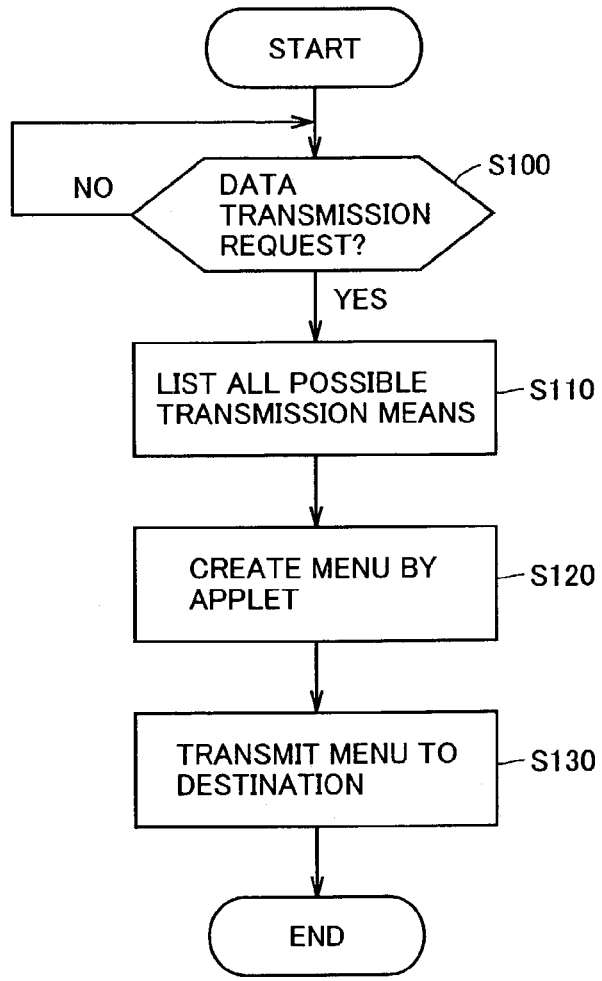
FIG. 4 is a flow chart showing a process for image input device 1 to receive transmission means from data receiving device 4 as a destination.

FIG. 4 is a flow chart showing a process for image input device 1 to receive a designation of transmission means from data receiving device 4 as a destination. Referring to FIG. 4, when the user of image input device 1 instructs data receiving device 4 as a desired destination to transmit data, i.e. a data transmission request is accepted using image input device 1 (YES at S100), a search is conducted for transmission means available for transmission to the destination, and all the extracted transmission means available for the transmission are listed (S110). The transmission means includes a Scan To E-mail function, a Scan To FTP (File Transfer Protocol) function, and an IFAX (Internet Fax) to Print function.

Figure 5:
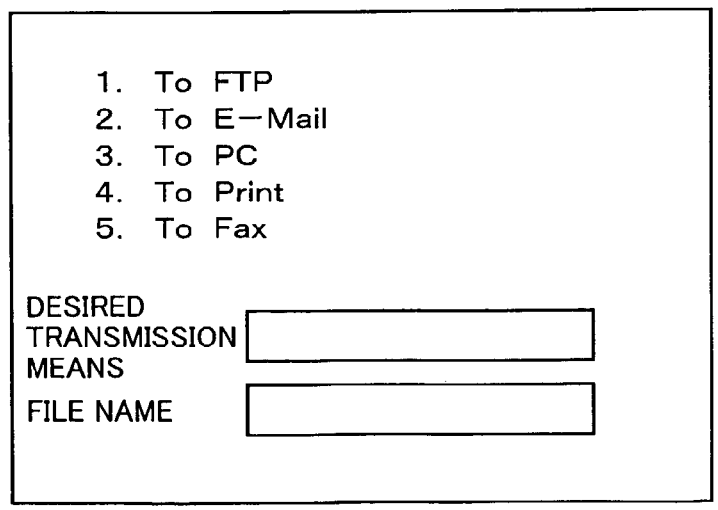
FIG. 5 is a view showing a specific example of a selection menu.

A selection menu executed as an applet such as Java® is created for receiving a selection of transmission means from the destination (S120). An exemplary selection menu as created here is shown in FIG. 5. The exemplary selection menu shown in FIG. 5 includes as possible data transmission means, transfer to FTP server, transmission by e-mail, transfer to data receiving device 4, an output at printer unit 14, and transmission as facsimile data. The destination can use the selection menu to designate the priority order of desired transmission means and a file name when the transmitted data is received. The priority order of desired transmission means is the order of priority in transmitting data through another transmission means from image input device 1 in case the data could not be transmitted through the selected transmission means. The selection menu as created in this manner is transmitted to data receiving device 4 (S130), and the process will end.

Figure 6:
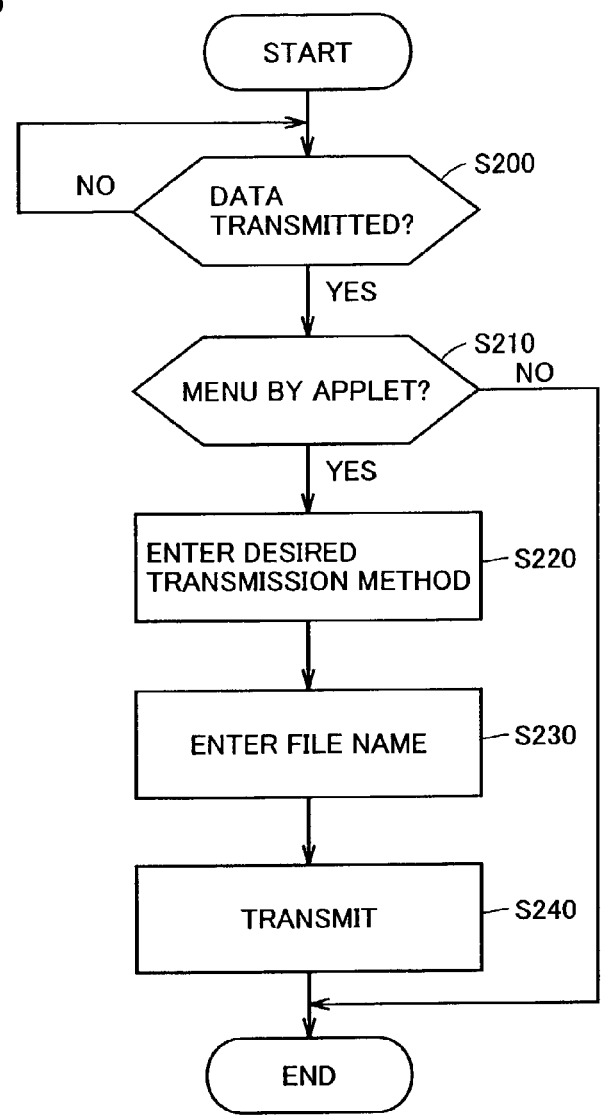
FIG. 6 is a flow chart showing a process at data receiving device 4 that has received the selection menu.

FIG. 6 shows a flow chart showing a process at data receiving device 4 that has received the above-noted selection menu. Referring to FIG. 6, when the control unit of data receiving device 4 detects reception of data (Yes at S200), it is determined whether the received data is a selection menu created by the applet, and if it is not a selection menu created by the applet (No at S210), then the process will end.

Figure 7:
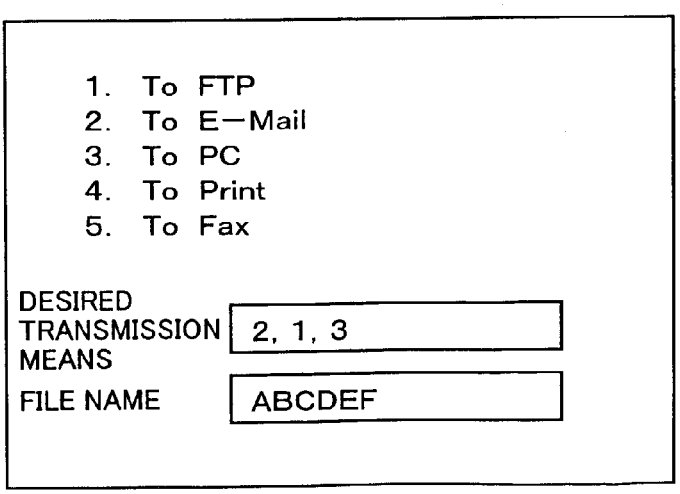
FIG. 7 is a view showing a specific example of a designated selection menu.

If the received data is a selection menu created by the applet (Yes at S210), desired transmission means is entered (S220) and a desired file name is also entered (S230) on the selection menu. At step S220, a plurality of transmission means can be selected. At step S230, a desired file name may not be entered. If a file name is not entered, a file name determined at image input device 1 is adopted. Specifically, in the selection menu shown in FIG. 5, desired transmission means and the like can be entered and designated as shown in FIG. 7. In other words, the priority order of e-mail transmission, FTP server transfer and transfer to data receiving device 4 can be set as desired transmission means, and "ABCDEF" can be designated as a file name. The data of the designated selection menu is transmitted to image input device 1 (S240), and the process will end.

Figure 8:
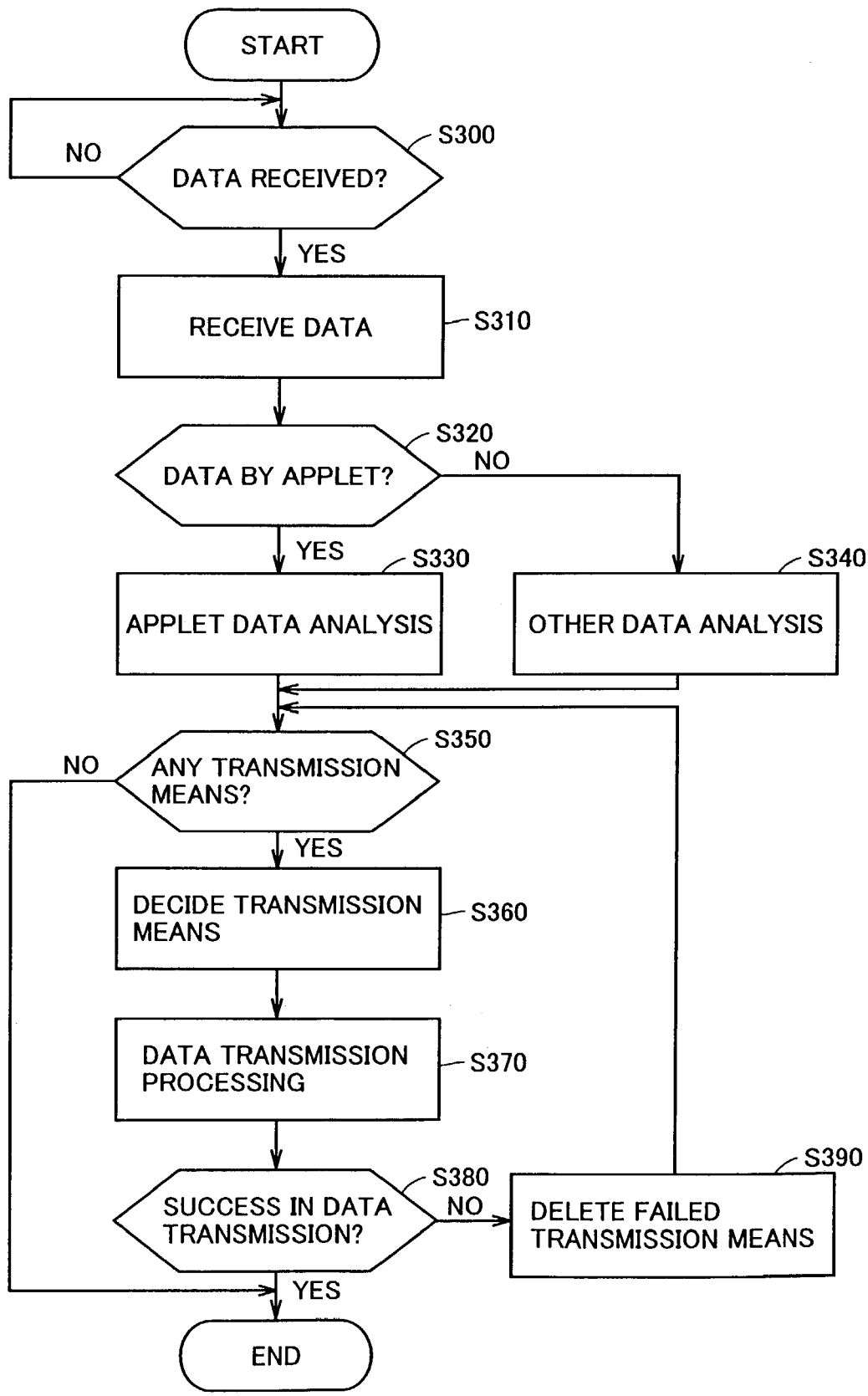
FIG. 8 is a flow chart showing a process at image input device 1 receiving a designated selection menu.

FIG. 8 shows a flow chart showing a process at image input device 1 that has received the designated selection menu as described above. Referring to FIG. 8, when control unit 31 of image input device 1 detects reception of data (Yes at S300), data receiving unit 16a receives data (S310). It is then determined whether the received data is a selection menu created by the applet, and if the received data is a selection menu created by the applet (Yes at S320), an analysis of the applet is performed (S330). If it is not a selection menu created by the applet (No at S320), an analysis corresponding to that data is performed (S340). Specifically, the data may be URL (Uniform Resource Locators) data, which will be described later.

The transmission means designated by the received data is then read (Yes at S350), and the transmission means designated to the high priority is decided as transmission means to be executed (S360). If the selection menu set as shown in the specific example in FIG. 7 is received at step S310, e-mail transmission is firstly decided as the transmission means to be executed at step S360. The data stored in storage unit 23 with the designated file name ("ABCDEF") is transmitted by the decided transmission means (e-mail transmission) (S370).

When control unit 31 detects a success in data transmission at step S370 (Yes at S380), this process will end. On the other hand, if a failure in data transmission is detected (No at S380), the transmission means decided as the transmission means to be executed at step S360 (the transmission means having highest priority) is deleted (S390), and the transmission means designated to the next highest priority is decided as the transmission means to be executed and the aforementioned steps S350-S380 are repeated until a success in data transmission is detected. In other words, in the example above, when the failure in data transmission by e-mail transmission is detected, transfer to FTP server is then decided as transmission means for data transmission. When the failure in data transmission by transfer to FTP server is further detected, the transfer to data receiving device 4 is then decided as transmission means.

In the present embodiment, the aforementioned processing by image input device 1 results in the output processing as desired by the destination. In other words, data is transmitted by transmission means available for data receiving device 4 to receive the data. Furthermore, data can be transmitted reliably based on the priority order set by the destination.

Figure 9:
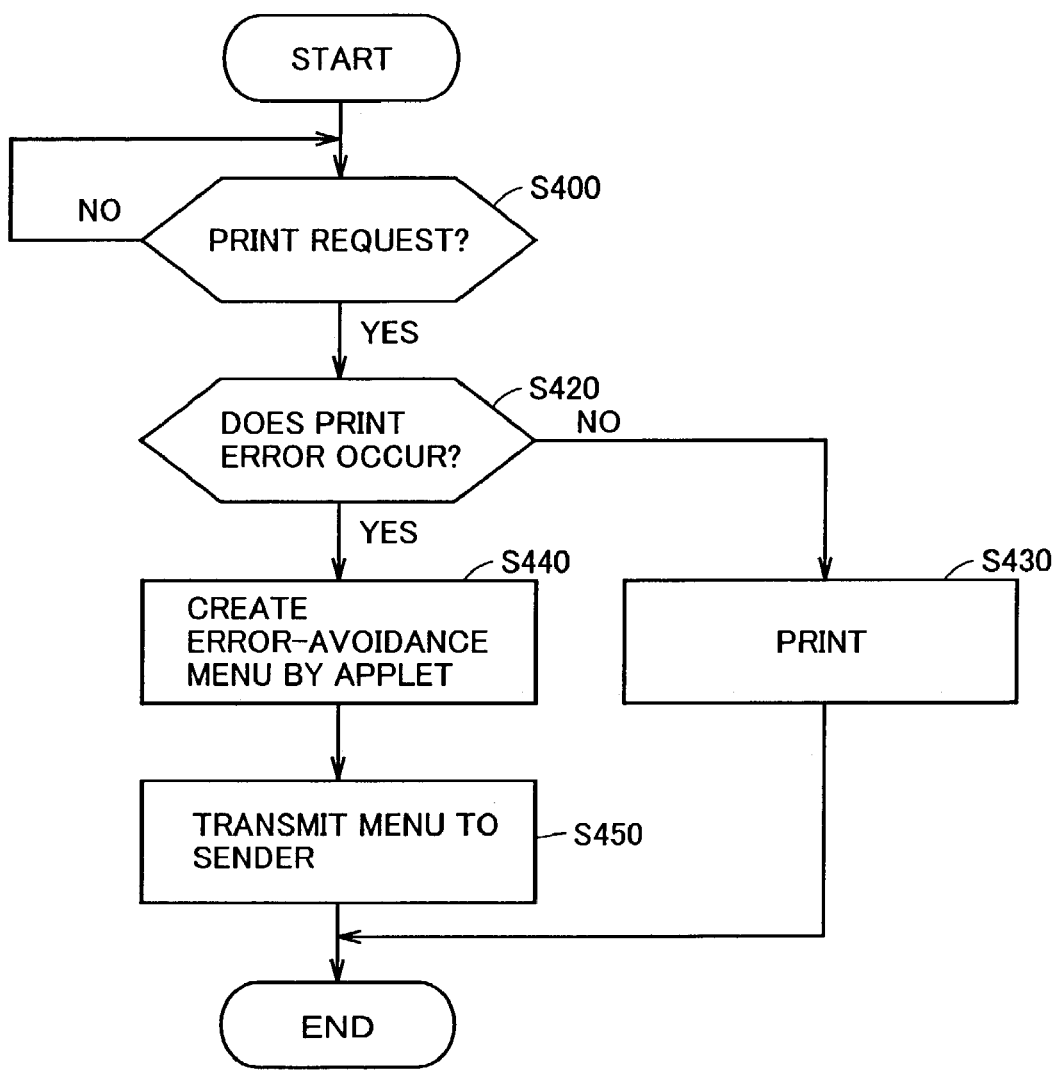
FIG. 9 is a flow chart showing a process at image input device 1 where an error occurs in execution of print output.
Figure 10:
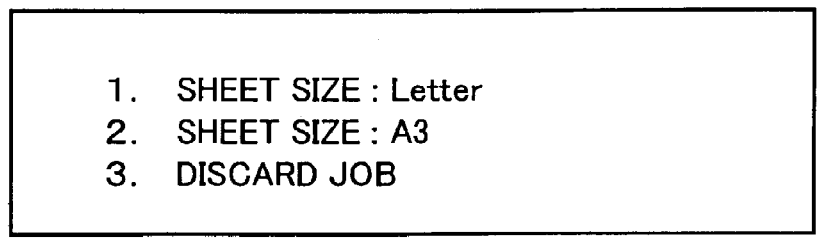
FIG. 10 is a view showing a specific example of an error-avoidance menu.

If the output at printer unit 14 (To Print) is selected on the selection menu and an error occurs in the execution of the print output at image input device that has received the selection menu, the process shown in the flow chart of FIG. 9 is executed in image input device 1. Referring to FIG. 9, if data is transmitted by means of the print output as selected from data receiving device 4 as the destination (Yes at S400), control unit 31 determines whether a print error occurs (S420). If no print error occurs (No at S420), the print output is performed at printer unit 14 (S430). If a printer error occurs (Yes at S420), an error-avoidance menu is created by the applet (S440). Here, an exemplary error-avoidance menu created at step S440 is shown in FIG. 10. The error-avoidance menu shown in FIG. 10 is created at step S440 if the printing data received at step S400 includes a job for printing on A4 sheet and when an A4-sized sheet is not set in image input device 1 and only Letter-sized and A3-sized sheets are set. In the error-avoidance menu shown in FIG. 10, the error can be avoided by executing the job by performing the print output to a Letter-sized sheet or to an A3-sized sheet in accordance with the priority order. It is also shown that the error is avoided by discarding the job as the next order of the priority. The created error-avoidance menu described above is then transmitted to the destination (S450).

The image input device 1 in the present embodiment carries out the aforementioned error-avoidance process to provide a reliable print output even if the user does not check at image input device 1 whether the print is normally output, in the case of a print error. Although the aforementioned error-avoidance process has been illustrated as the avoidance process in the case of a print error, the output means is not limited to the print output and may be a scan output, a facsimile output, and any other output.

Although the selection result at data receiving device 4 as a destination is returned as the applet in the present embodiment, by way of illustration, only data of selection result may be returned.

It is noted that while in the process described above, image input device 1 performs a process of creating a menu using the applet, the menu may be created and transmitted using any other method. Here, the use of URL will be described as a modification in the following.

Modification

Figure 11:
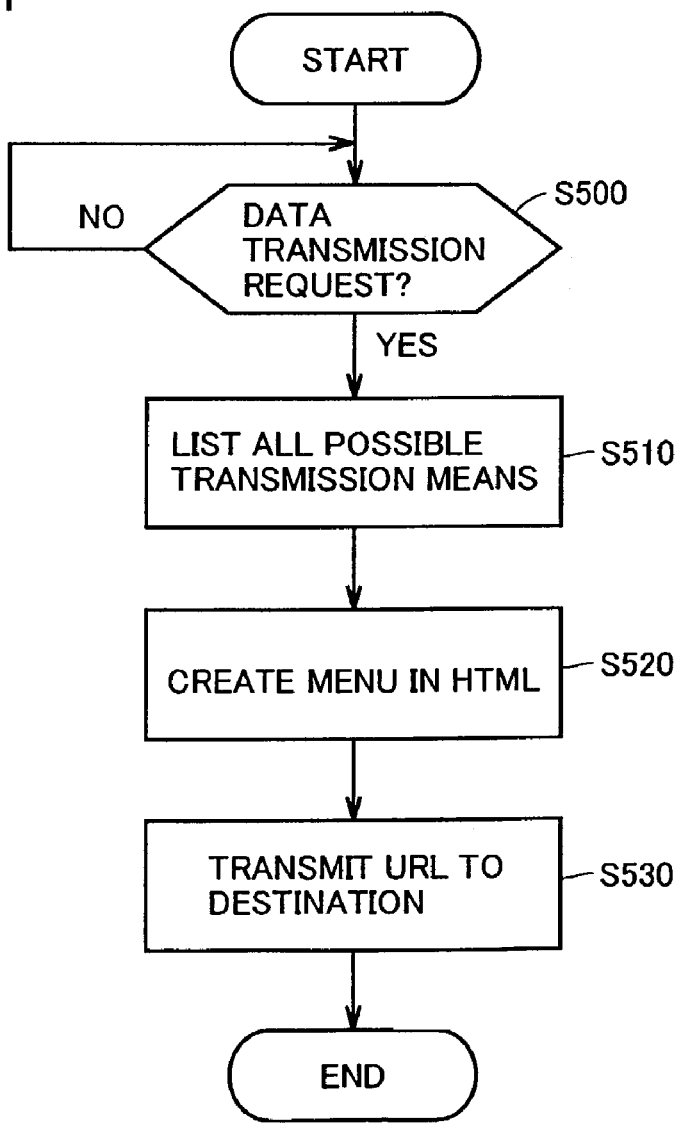
FIG. 11 is a flow chart showing a process for image input device 1 in a modification to receive a designation of transmission means from data receiving device 4 as a destination.

FIG. 11 is a flow chart showing a process for image input device 1 in a modification to receive a designation of transmission means from data receiving device 4 as a destination. Referring to FIG. 11, when the user of image input device 1 instructs data receiving device 4 as a desired destination to transmit data, i.e. a data transmission request is accepted using image input device 1 (Yes at S500), all transmission means available to the destination are listed (S510). A selection menu for receiving a selection of transmission means from the destination is created in HTML language (S520). Here, a website of a selection menu is created as shown in the example in FIG. 5. URL for accessing this website is transmitted to data receiving device 4 (S530), and the process will end.

Figure 12:
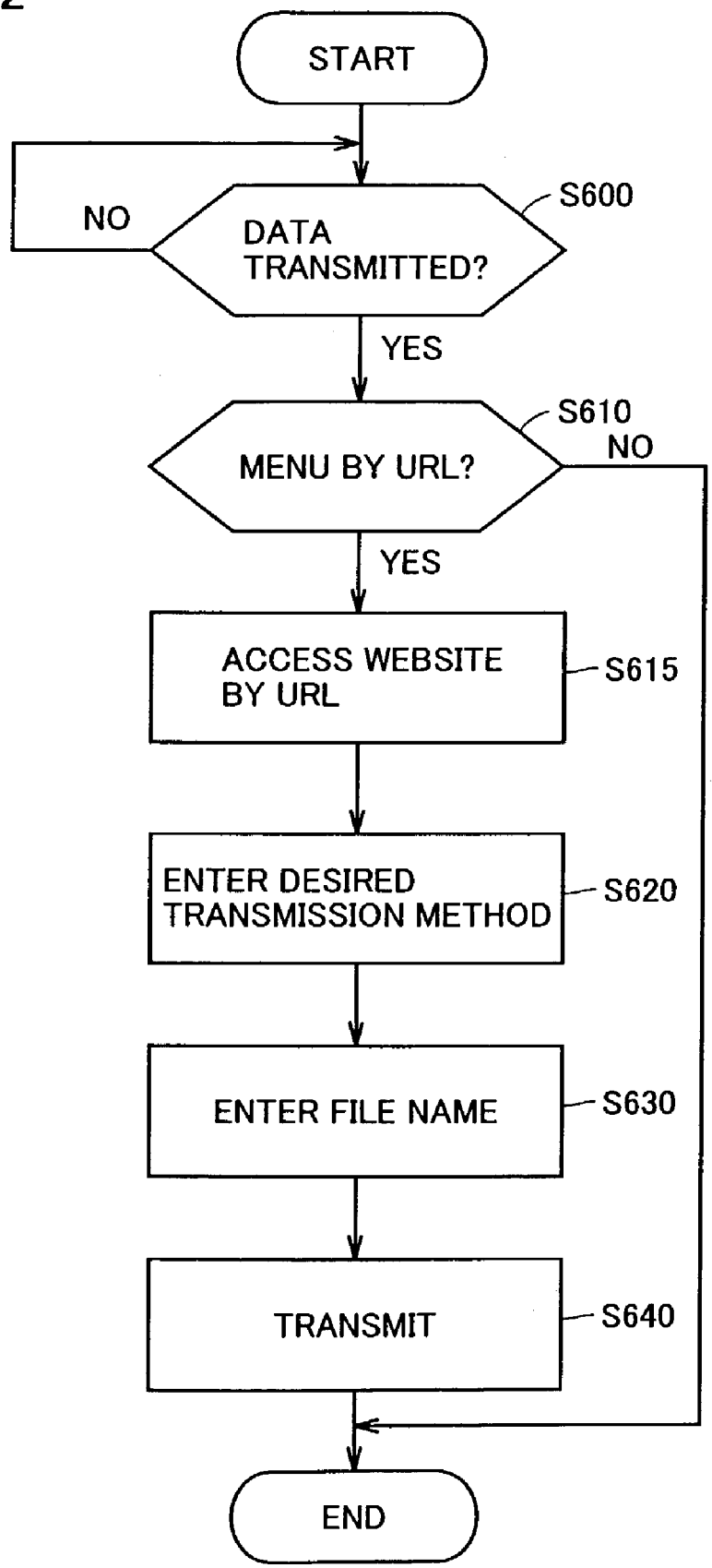
FIG. 12 is a flow chart showing a process at data receiving device 4 that has received URL for accessing a selection menu.

FIG. 12 shows a flow chart showing a process at data receiving device 4 that has received URL for accessing the aforementioned selection menu. Referring to FIG. 12, when the control unit of data receiving device 4 detects reception of data (Yes at S600), it is determined whether the received data is URL for accessing the selection menu, and if it is URL for accessing the selection menu (Yes at S610), the website of the selection menu is accessed based on that URL (S615). If the received data is not URL for accessing the selection menu (No at S610), the process will end.

On the selection menu on the website, desired transmission means is entered (S620) and a desired file name is further entered (S630). Here, the specific inputs are similar to those in the example shown in FIG. 7, and therefore description thereof will not be repeated. URL for accessing the selection menu having a designated destination is transmitted to image input device 1 (S640), and the process will end.

In image input device 1 that has received URL as described above, the process shown in FIG. 8 is executed. More specifically, data analysis is performed to acquire URL at step S340, as the received data is not data by the applet but URL at step S320 in FIG. 8. The selection menu having a designated destination is accessed based on the URL and information of the designated destination is acquired as shown in the example in FIG. 7. Thereafter, the processes at steps S350-S390 in FIG. 8 are repeated in accordance with the priority order as being input, until the success in data transmission is detected.

The aforementioned process in image input device 1 in the modification in this manner also results in the output processing as desired by the destination, thereby enhancing the user's convenience.

It is noted that although a selection result at data receiving device 4 as a destination is returned as URL in the aforementioned modification by way of illustration, only data of a selection result may be returned.

Figure 13:
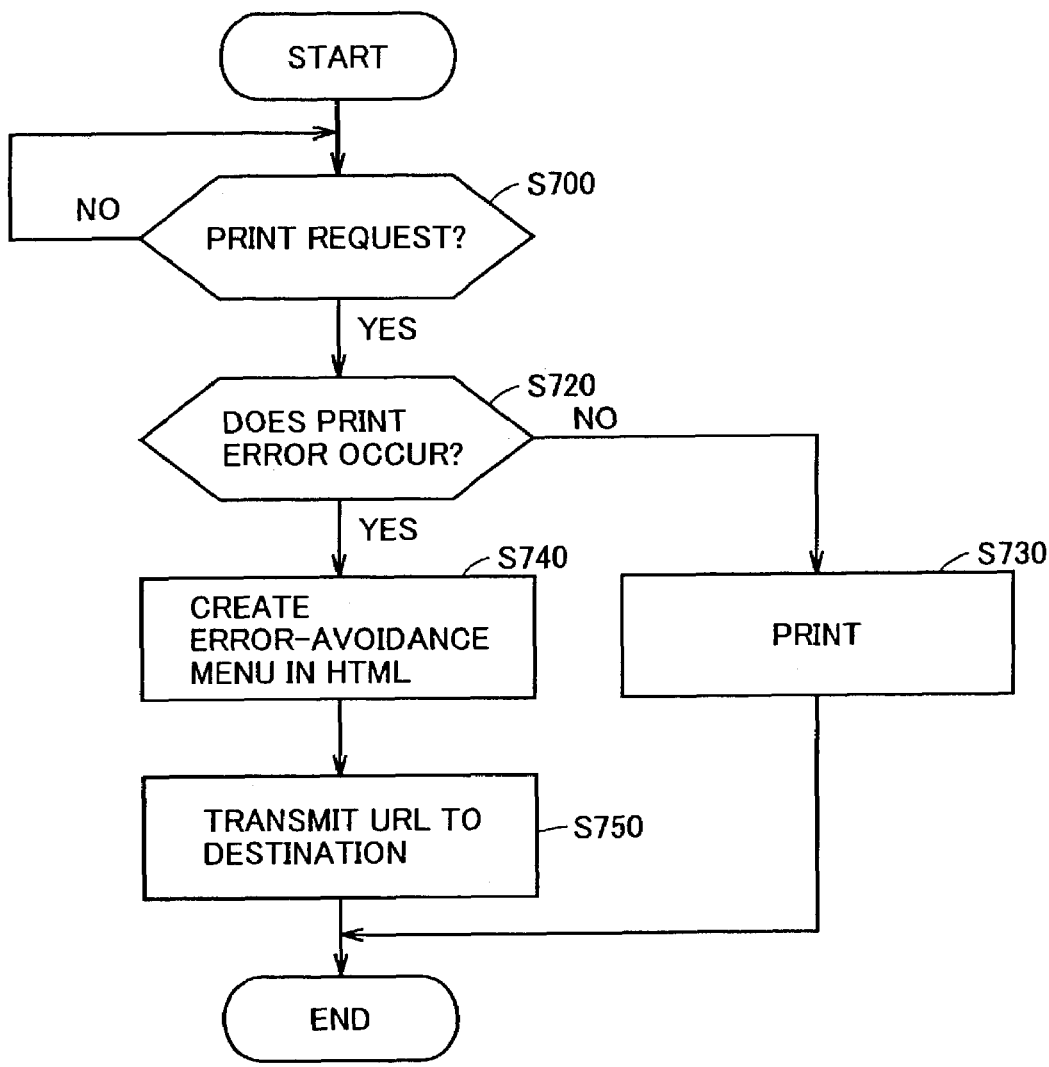
FIG. 13 is a flow chart showing a process at image input device 1 in a modification where an error occurs in execution of print output.

In image input device 1 in the modification, if an output at printer unit 14 (To Print) is selected on the aforementioned selection menu and an error occurs in the execution of the print output at image input device 1 receiving the selection menu, a process shown in the flow chart in FIG. 13 is executed. Referring to FIG. 13, if data transmission is performed by means of the print output selected at data receiving device 4 as the destination (Yes at S700), control unit 31 determines whether a print error occurs (S720). If no print error occurs (No at S720), the print output is performed at printer unit 14 (S730). If a print error occurs (Yes at S720), an error-avoidance menu is created in HTML language (S740). Here, the created error-avoidance menu is similar to the error-avoidance menu as shown in the example in FIG. 10, and description thereof will not be repeated. URL for accessing the created error-avoidance menu is then transmitted to the destination (S750).

The error-avoidance processing as described above by image input device 1 in the modification also results in a reliable print output even if the user does not check at image input device 1 whether the print is normally output, in the case of a print error.

Another Modification

In another modification, image input device 1 may transmit to data receiving device 4 a form on which only predetermined data processing methods can be selected, rather than executing the process of searching for the executable data processing methods and creating a form based on the search result. In other words, data input device 1 may store a selection menu in storage unit 23 in advance, and upon reception of a data transmission request, read the selection menu from storage unit 23, and transmit the selection menu to data receiving device 4 as the data destination at step S130, in place of the processes at steps S110-S120 above in FIG. 4.

In yet another modification, the process of creating a form is not performed in image input device 1. Instead, data receiving device 4 may be provided with a form on which only predetermined data processing methods can be selected, and data receiving device 4 may use this form. In other words, data receiving device 4 may store a selection menu in a storage unit (not shown) in advance, and upon detection of reception of data from image input device 1, read the selection menu from the storage unit at step S210 described above in FIG. 6 for the inputs at steps S220 and S230 on that selection menu, and then transmit the selection menu to image input device 1 as the data sender at step S240. In this case, when image input device 1 receives a data transmission request, it does not perform the processes at steps S110-S120 described above in FIG. 4, but transmits a notification that data will be transmitted to data receiving device 4 as the data destination at step S130.

It is noted that although image input device 1 performs the output processing such as a print output in the embodiment above, by way of illustration, the processing executed by image input device 1 is not limited to the output processing and may be any other data processing.

Furthermore, although the output processing is performed at image input device 1 in the present embodiment, by way of illustration, it may be performed at a computer such as a normal personal computer in place of the image input device. In this case, the similar process as described above can also be performed when data is transmitted from the computer to a data receiving device as a desired other party.

Furthermore, the output control method and the error-avoidance method performed by image input device 1 described above can be provided as a program. Such a program can be recorded in a computer readable recording medium such as a flexible disk, a CD-ROM, an ROM, an RAM, and a memory card attached to the computer and provided as a program product. Alternatively, the program can be provided as recorded in a recording medium such as a hard disk contained in a computer. The program can also be provided as being downloaded through the network.

The provided program product is installed in a program storing unit such as a hard disk for execution.

It is noted that the program product includes a program itself and a recording medium on which the program is recorded.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data processing device comprising:
a search unit searching for and extracting plural kinds of data providing methods executable in said data processing device;
a preparation unit preparing, in response to an instruction input by an operator of the data processing device, a form on which at least one kind of data providing method can be selected among all of the data providing methods extracted by said search unit;
a communication unit transmitting said form prepared by said preparation unit to another device to allow an operator of said other device to select at least one kind of data providing method, and receiving a result of the selection from said other device; and
a processor processing data based on the selected data providing method.

2. The data processing device according to claim 1 wherein said preparation unit prepares said form as a program executable in said other device.

3. The data processing device according to claim 1 wherein said preparation unit prepares said form in Hyper Text Markup Language.

4. The data processing device according to claim 1 wherein said data processing device is an MFP (Multi Function Peripheral), and said other device is a personal computer connected to said MFP over a network.

5. The data processing device according to claim 1 wherein said data providing method includes at least one of a FTP transmission method, an e-mail transmission method, a PC transfer method, a printing method, and a facsimile method.

6. A data processing device with plural kinds of data providing methods, comprising:
   a transmitting unit transmitting a form to another device in response to an instruction input by an operator of the data processing device, said form allowing an operator of said other device to select at least one kind of data providing method on said other device;
   a receiving unit receiving a result of the selection on said form from said other device; and
   a processor processing data based on the selected data providing method.

7. The data processing device according to claim 6 wherein said transmitting unit transmits a predetermined form.

8. The data processing device according to claim 6 further comprising a preparation unit preparing said form as a program executable on said other device.

9. The data processing device according to claim 6 further comprising a preparation unit preparing said form in Hyper Text Markup Language.

10. The data processing device according to claim 6 wherein said data providing method includes at least one of an FTP transmission method, an e-mail transmission method, a PC transfer method, a printing method, and a facsimile method.

11. A data providing method used in a system with a data processing device having plural kinds of data providing methods and another device connected to said data processing device via a network, comprising the steps of:
   accepting an instruction input to the data processing device by an operator of the data processing device, the instruction being a request for preparing a form for selecting a kind of data processing method;
   preparing by the data processing device, in response to the input instruction, the form on which at least one kind of data processing method can be selected;
   transmitting, from the data processing device, the form to another device to allow an operator of said other device to select at least one kind of data providing method;
   receiving, by the data processing device, the form from said other device after the selection by the operator of said other device has been completed; and
   processing data, by the data processing device, based on the selected data providing method.

12. The data providing method according to claim 11 wherein, in said step of preparing a form, said form is prepared as a program executable on said other device.

13. The data providing method according to claim 11 wherein, in said step of preparing a form, said form is prepared in Hyper Text Markup Language.

14. The data providing method according to claim 11 wherein said data providing method includes at least one of an FTP transmission method, an e-mail transmission method, a PC transfer method, a printing method, and a facsimile method.

15. A data providing method used in a data processing device capable of executing plural kinds of data providing methods and connected to another device via a network, said method comprising the steps of:
   accepting a data providing request input by an operator of the data processing device;
   transmitting, to said other device, a request to send information concerning at least one desired data providing method which is executable by the data processing device;
   receiving a response from said other device concerning said at least one desired data providing method selected by a person who is a data recipient; and
   processing data based on the selected data providing method.

16. A data providing method used in a system with a data processing device capable of executing plural kinds of data providing methods and another device connected to said data processing device via a network, said method comprising the steps of:
   accepting a data providing request input to the data processing device by an operator of the data processing device;
   transmitting, to said other device, a request to send information concerning at least one desired data providing method which is executable by the data processing device;
   receiving a response from said other device concerning said at least one desired data providing method selected by a person who is a data recipient; and
   processing data, by the data processing device, based on the selected data providing method.

17. A data processing device capable of executing plural kinds of data providing methods and connected to another device via a network, said data processing device comprising:
   an input portion for accepting an input by an operator of the data processing device requesting that data be provided;
   a communication portion for transmitting a request to said other device to send information concerning at least one desired data providing method executable by the data processing device, and receiving a response from said other device concerning at least one desired data providing method selected by a person who is a data recipient; and
   a processor for processing data based on the selected data providing method.

* * * * *